Patented Oct. 11, 1949

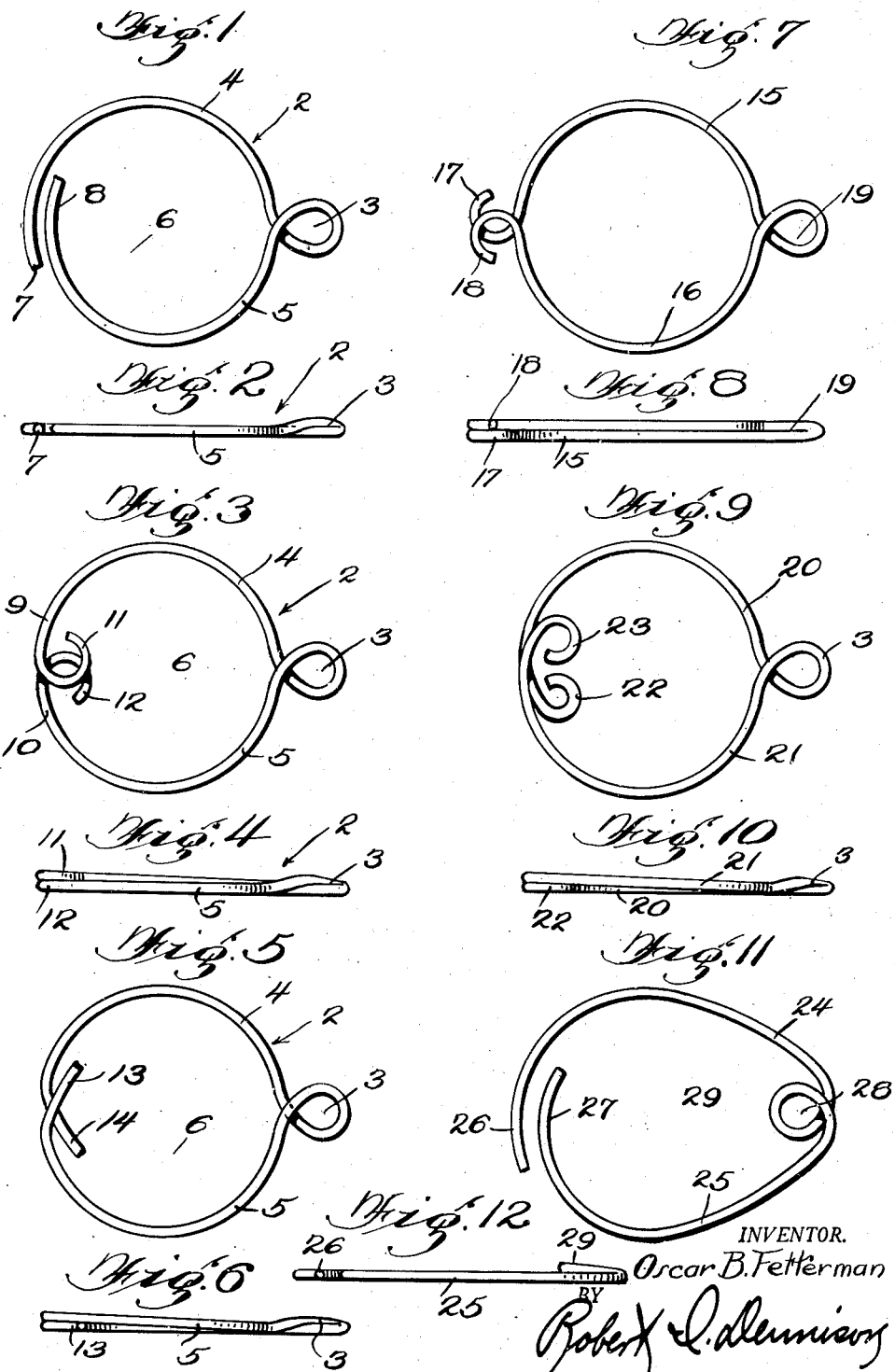

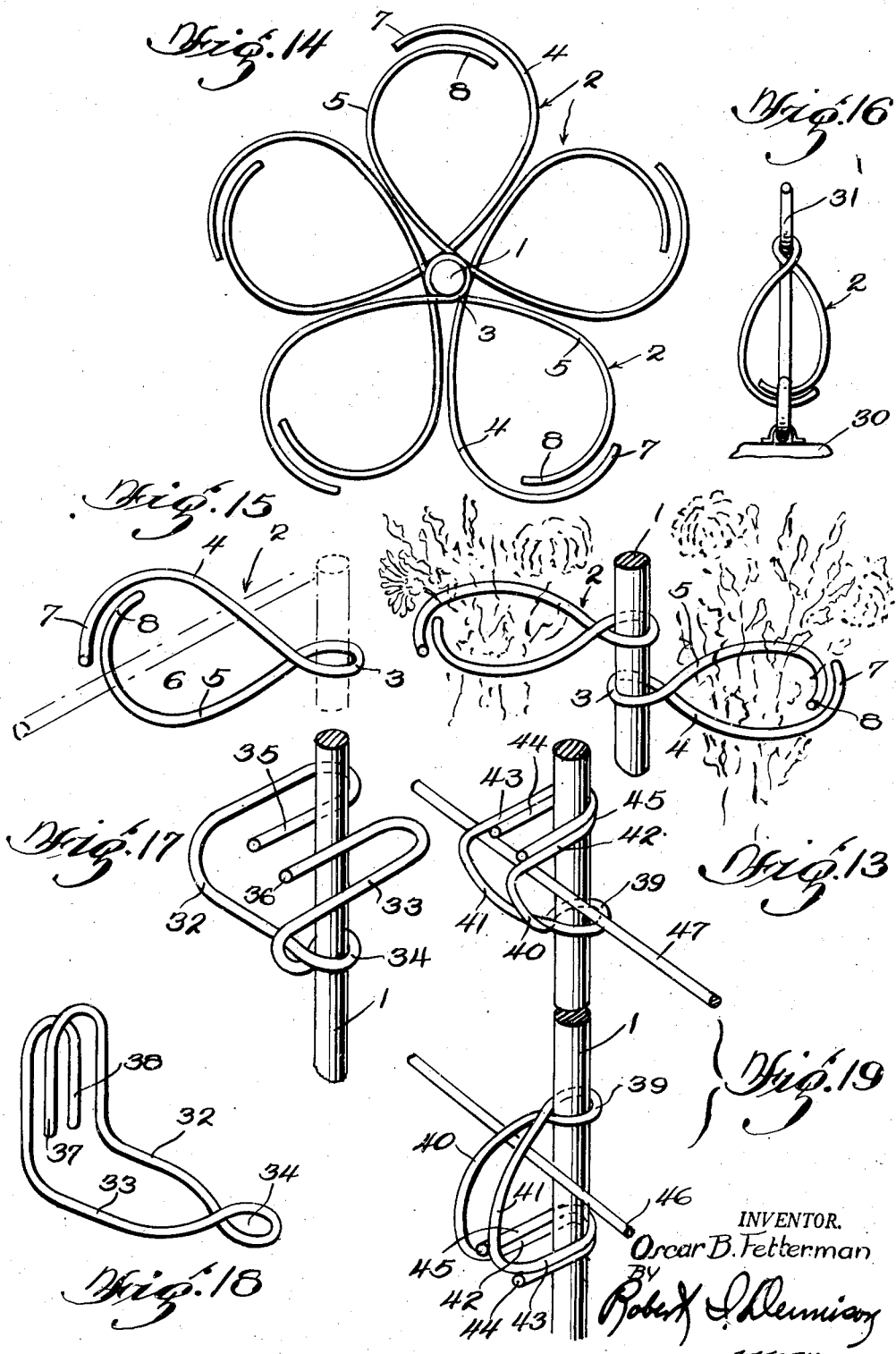

2,484,449

UNITED STATES PATENT OFFICE 2,484,449

SPRING CLIP FOR WIRE FENCES

Oscar B. Fetterman, Washington, D. C.

Application February 13, 1945, Serial No. 577,648

2 Claims. (Cl. 256—57)

1

The present invention relates to improvements in wire fasteners and has reference more particularly to a spring clip structure.

One of the important objects of the present invention is to provide a spring clip that includes a support engaging eye and an article engaging and supporting loop.

Another object is to provide a spring clip that is formed from a single strand of wire wherein the article engaging loop may be engaged or disengaged from the article supported thereby without removing the clip from its support.

A still further object of the present invention resides in the provision of a spring clip wherein the free ends of the article engaging loop thereof are so arranged as to prevent disengagement of the article from said loop, yet permitting the article to be readily and easily positioned within the loop while the eye portion of the clip remains frictionally held on the support.

A further object is to provide a spring clip wherein the eye portion thereof can be quickly and easily vertically adjusted on the supporting standard and frictionally held in any adjusted position.

A still further object is to provide a spring clip that can be manufactured at a very low cost and one which will at all times be strong and durable and efficient in carrying out the purposes for which it is designed.

Other objects and advantages will become apparent from the following description when taken in connection with the accompanying drawings.

In the drawings, wherein like reference characters designate corresponding parts throughout the several views:

Figure 1 is a top plan view of one form of the spring clip embodying my invention;

Figure 2 is a side elevation thereof;

Figure 3 is a top plan view of a modification of the spring clip;

Figure 4 is a side elevation thereof;

Figure 5 is a top plan view of another modification of the spring clip;

Figure 6 is a side elevation thereof;

Figure 7 is a top plan view of a further modification of the spring clip;

Figure 8 is a side elevation thereof;

Figure 9 is a top plan view of still another form of the spring clip;

Figure 10 is a side elevation thereof;

Figure 11 is a top plan view of another design of spring clip embodying my invention;

Figure 12 is a side elevation thereof;

Figure 13 is a perspective view showing the manner in which my spring clip supports growing plants adjacent a plant stake;

Figure 14 is a top plan view showing a plurality of spring clips mounted on a plant stake for supporting a plurality of growing plants around the stake;

Figure 15 shows my spring clip for supporting a wire or rope;

Figure 16 is a view of the spring clip suspending an article such as a lantern or beetle trap from a supporting rod;

Figure 17 shows another modification of spring clip for use in attaching lawn fencing or trellises to a fence rod or stake;

Figure 18 is a detail perspective view of a further modification of spring clip for use in attaching lawn fencing and trellises to a fence rod, the clip in this view showing the larger portion thereof before it is bent back upon itself; and Figure 19 shows a pair of modified spring clips used to secure lawn fencing on a fence rod or stake, and illustrating the manner in which said clips secure the fencing on the supporting rod.

Attention is directed to Figure 13 of the drawings, wherein there is illustrated a pair of spring clips arranged on a plant stake 1 for supporting growing plants adjacent the stake.

The spring clip denoted generally by the numeral 2 is formed from a single strand of spring wire and is so bent as to form a restricted eye portion 3 that encircles and frictionally grips the stake 1.

Oppositely curved arms 4 and 5 extend from the eye portion and these arms cross one another at their inner ends at their juncture with said eye portion. The free outer ends of these arms are disposed in the same plane and are arranged in overlapping relation and these oppositely curved arms cooperate to form an article engaging and supporting loop 6.

In Figures 1, 2 and 13 of the drawings, it will be observed that the free end 7 of the curved arm 4 extends slightly around the free end 8 of the oppositely curved arm 5 and is spaced therefrom to permit the stems of the growing plant to be easily slipped into the loop 6 and this, while the clip remains engaged on the plant stake 1.

It is readily apparent that by merely pushing the oppositely curved arms 4 and 5 inwardly toward each other, the eye portion 3 is disengaged from frictional binding in the supporting rod or stake 1, thus permitting the spring clip to be vertically adjusted on the rod and as soon as pressure is released from the curved arms, the latter will spring outwardly and automatically cause the eye portion to firmly grip the rod or stake 1 and lock the spring clip against slippage on the rod.

Further, this spring clip can be applied or removed from the stake at any time after the plant has grown or bloomed without injuring the plant stem or bloom. Further, with my improved spring clip the plant will be properly supported without any fastening element tightly binding upon the plant or its stem, the plant being entirely confined within the supporting loop 6.

In Figure 3, a modification of spring clip is shown where, instead of the free ends of the oppositely curved arms being arranged as shown in Figure 1, the free ends 9 and 10 are formed with turned back portions 11 and 12, respectively, and these turned back portions are disposed in overlapping relation with respect to one another.

This form of spring clip will function in the same manner as the spring clip previously described and the overlapping turned back free ends 11 and 12 can be readily and easily separated to permit the clip to engage around the plant or to enable the clip to be disengaged from the plant wherever necessary without causing injury to the plant.

In Figure 5 the spring clip is very similar to the form shown in Figure 3, except that the overlapping free ends 13 and 14 are not curved.

Figure 7 shows a further modification of the spring clip wherein the oppositely curved arms 15 and 16 terminate at their free ends in outwardly and reversely curved portions 17 and 18 and said outwardly and reversely curved portions are disposed in overlapping relation, similar to that in which the curved ends 11 and 12 of the arms of the clip shown in Figure 3 are arranged. The stake engaging and clamping eye 19 is provided intermediate the ends of a single strand of wire. The free ends of the clip constitute legs or arms 15 and 16.

In Figure 9, the spring clip is similar to the design illustrated in Figure 3, except that the free end portions of the oppositely curved arms 20 and 21 overlap rather than the curved terminals 22 and 23 of said arms.

Figure 11 shows a spring clip similar to the design illustrated in Figure 1 in that the oppositely curved arms 24 and 25 have their outer free ends 26 and 27 disposed in the same plane and being spaced from one another. The stake engaging eye 28 formed at the inner ends of the arms 24 and 25 is disposed within the loop 29 rather than outwardly of the plant receiving loop as in the previously described forms of my spring clip.

Where a plurality of plants are to be supported around a single supporting stake 1, a plurality of spring clips are arranged on the stake in the manner as shown in Figure 14.

Attention is now directed to Figure 15 wherein the spring clip is employed for supporting a wire or rope across a supporting standard. It will be readily observed that after the spring clip is properly adjusted on the vertical supporting standard, the horizontally extending rope or wire can be easily and quickly inserted into the loop 6 between the spaced ends 7 and 8 of the spring clip and the clip will support the rope or wire without any danger of the rope or wire becoming disengaged from the spring clip.

In Figure 16 the spring clip 2 is utilized for suspending a lantern beetle trap 30 from a supporting standard 31, and in such a manner as to preclude the suspended object from becoming disengaged from the supporting standard.

In Figure 17 I have disclosed a form of spring clip employed for attaching wire fencing or trellises to a supporting standard. In this form, the spring clip includes a pair of spring arms 32 and 33 that are interconnected at their inner ends by a standard engaging eye portion 34.

These spring arms are bent back upon themselves and the free ends of these arms terminate in inwardly disposed parallel gripping fingers 35 and 36 which grip opposite sides of the supporting standard 1 in the manner as clearly illustrated in the drawings.

With this type of spring clip, the same is initially positioned on the supporting standard 1 and then the arms of the clip are engaged around the adjacent portions of the wire fencing after which the spring fingers 35 and 36 are brought into gripping engagement with the standard, thus securely holding the wire fencing against the standard.

The spring clip shown in Figure 18 is also used in supporting wire fencing and differs from the clip shown in Figure 17 by having the supporting standard gripping fingers 37 and 38 overlapping one another rather than being disposed in the same plane as is the case with the arrangement of the gripping fingers, shown in Figure 17.

Attention is now directed to Figure 19 wherein a further modification of spring clip is employed for securing wire fencing or the like against a supporting standard. In this form, a pair of clips are employed, one for the upper portion of the wire fencing and another for the lower portion of the wire fencing.

In this form, the spring clip includes a standard gripping eye 39 from which extend the crossed arms 40 and 41. The outer end portions of these arms are bent laterally as indicated at 42 and 43 and the extremities of these laterally disposed portions are curved to form portions 44 and 45, respectively. The curved portion 44 overlaps the laterally extending portion 43 while the other curved portion 45 overlaps the laterally extending portion 42.

In connection with the construction disclosed in Fig. 19 it is to be noted that the eye 39 comprises a single strand of resilient wire and circumferentially embraces and grips the standard or post 1. The clamping eye 39 resiliently and frictionally grips the smooth standard 1. The hooks 42, 43, 44 and 45 are, at least, adjacent each other and are preferably superposed relatively to each other. It is also preferred that the hooks shall be arranged in opposed relation to each other thereby constituting twin spring hooks. The hooks are preferably in contact with each other but the pair of hooks are suitably spaced from the clamping eye. The axes of the hooks are in substantial alignment with the axis of the clamping eye 39. The axis of the standard coincides with the axes of the clamping eye and the hooks.

The assembled clip, fencing wires 46 and 47 and standard or post 1 constitute a new assemblage, comprising a new combination. The combined clip and standard surrounds a single fencing wire and retains the wire loosely on or adjacent the standard and within the major portion of the clip.

The clips, because of their resiliency, may be readily detached from the smooth standard 1.

In use, the spring clips shown in Figure 19 are initially positioned on the supporting standard 1 at the proper height. The lower clip is then engaged around the adjacent cross wire 46 of the wire fencing, after which the outer ends of the arms of the lower clip are brought into locking engagement with the supporting standard 1, the free ends of the arms being readily bendable and separated to permit proper engagement of the clip with the supporting standard.

After the lower spring clip has been properly attached, the reversely disposed upper spring clip is similarly manipulated to secure the upper cross wire 47 of the wire fencing against the standard 1.

By employing upper and lower spring clips of this particular type, there will be no tendency of the wire fencing to move either upwardly or downwardly on the supporting standard, thus locking the wire fencing at its properly adjusted height on the supporting standard.

Spring clips of the character shown and described herein can be readily and easily attached or removed and this without necessitating the use of any tools. Also, by constructing the spring clip in the manner shown and described, the same can be used over and over again and due to its simplicity can be manufactured at a very low cost.

While I have shown the preferred embodiments of my invention, it is to be understood that various changes in the size, shape and arrangement of parts may be resorted to without departing from the spirit of the invention and the scope of the appended claims.

Having thus described my invention, what I claim is:

1. A fence construction comprising upright standards, fencing wire and spring clips, said standards being smooth and uninterrupted by notches or humps throughout its full length, said fencing wires being arranged transversely of said standards and being retained loosely on said standards by said spring clips, each spring clip being provided with a resilient clamping eye and a pair of substantially coplanar superposed hooks, said eye entirely surrounding one of said standards and frictionally embracing the same and normally retaining itself thereon, said hooks resiliently and frictionally embracing said standard at two positions spaced from said eye, said hooks engaging said standards in close proximity to each other, said spring clip and standard in their assembled relation loosely surrounding one fencing wire, whereby each fencing wire is free for longitudinal movement transversely of said standards in the fence construction.

2. In a fence construction, the subcombination constituting an article of manufacture comprising a spring clip adapted for use in fence construction having standards and fencing wire; said spring clip comprising a single piece of resilient wire of suitable length, said resilient wire being formed centrally of its length with a resilient clamping eye, said eye having embracing and gripping physical characteristics with said standard when in use, each end portion of said resilient piece of wire terminating in a resilient hook for engagement with said standard, said hooks being spaced from the clamping eye, said hooks being oppositely superposed substantially throughout their major portions with the axes of said hooks being placed in substantial alignment with the axis of said clamping eye when in use, whereby said spring clip is normally, in use, adapted to retain itself frictionally upon a standard with the fencing wire passing between the eye and hooks.

OSCAR B. FETTERMAN.

REFERENCES CITED

The following references are of record in the file of this patent:

UNITED STATES PATENTS

| Number | Name | Date |
| --- | --- | --- |
| 540,161 | Gross | May 28, 1895 |
| 674,290 | Wright | May 14, 1901 |
| 730,779 | Lacy | June 9, 1903 |
| 860,452 | Dorner | July 16, 1907 |
| 1,024,663 | Atkinson | Apr. 30, 1912 |
| 1,120,182 | Drewelow | Dec. 8, 1914 |
| 1,200,026 | Rice | Oct. 3, 1916 |
| 1,509,016 | Mershon, Jr. | Sept. 16, 1924 |
| 2,014,845 | Holland | Sept. 17, 1935 |
| 2,253,022 | Evans | Aug. 19, 1941 |

FOREIGN PATENTS

| Number | Country | Date |
| --- | --- | --- |
| 11,520 | Great Britain | 1915 |
| 20,606 | Great Britain | 1911 |